Jan. 3, 1933.   F. STOLZENBURG ET AL   1,893,454
HEATED TABLE
Original Filed Jan. 21, 1929   3 Sheets-Sheet 1
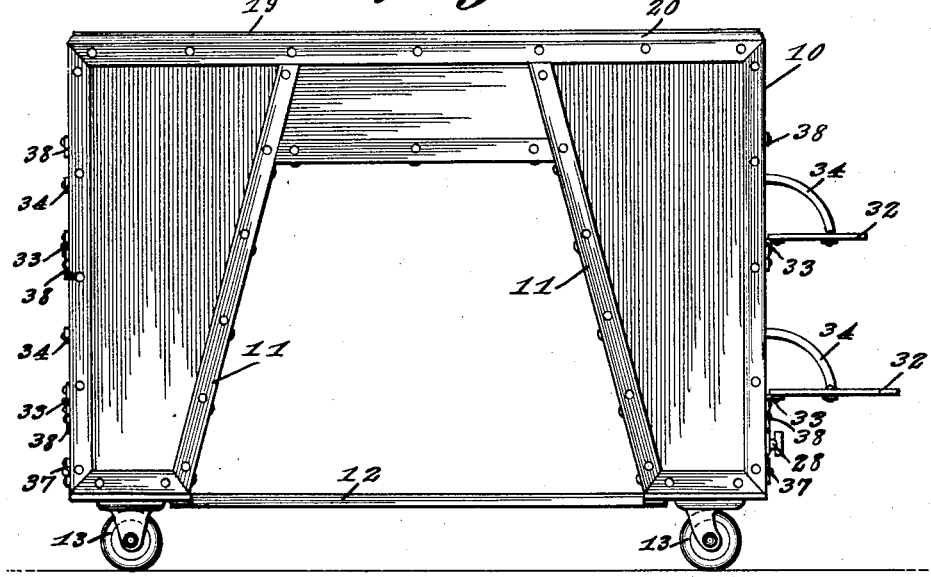
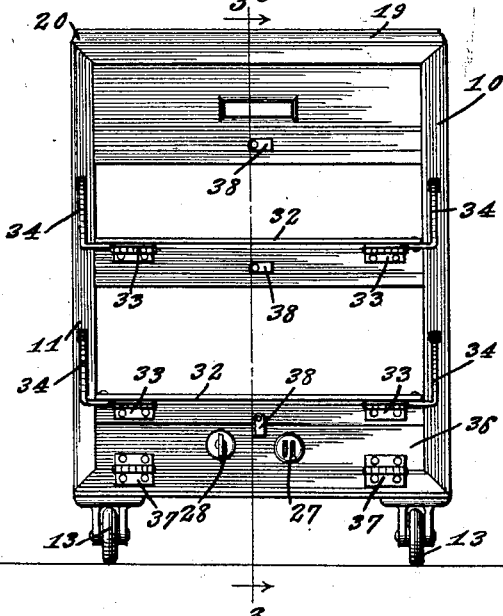
F. Stolzenburg
AND H. F. King, INVENTORS
BY Victor J. Evans
ATTORNEY

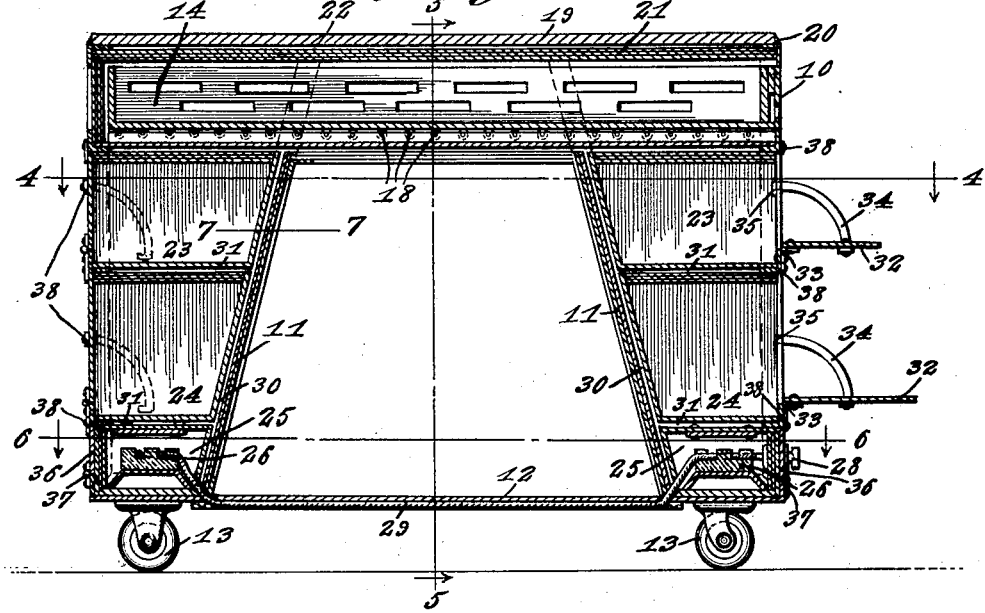
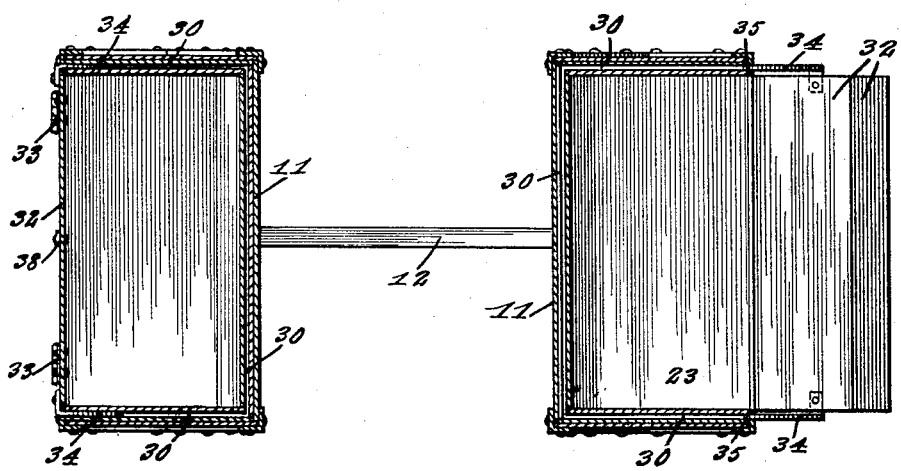

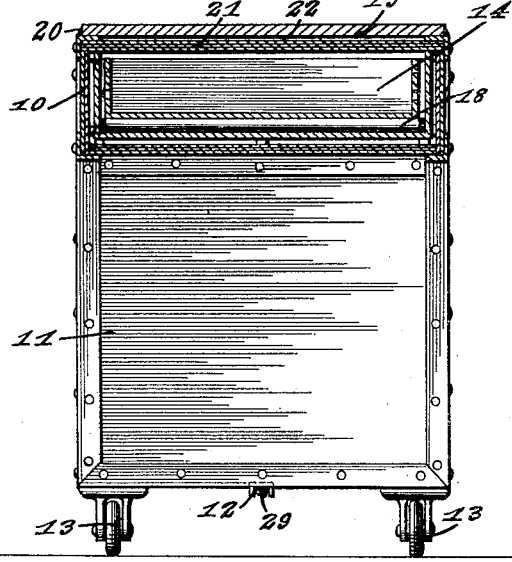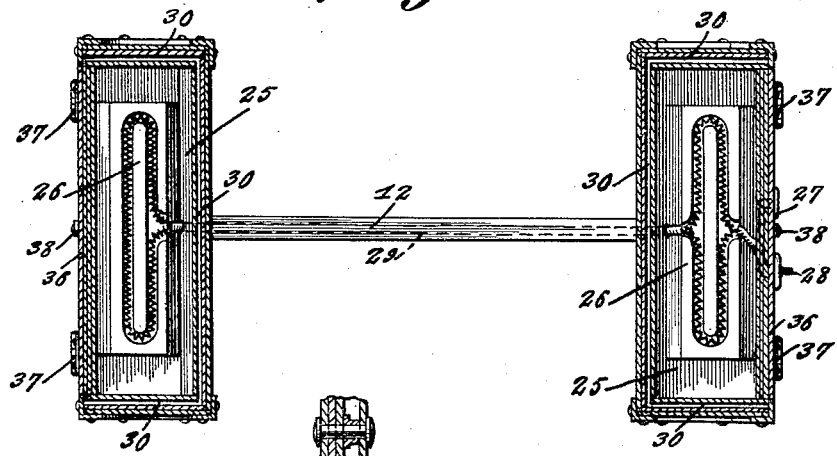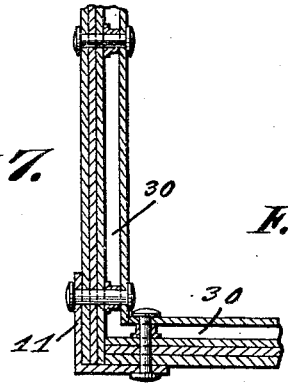

Patented Jan. 3, 1933

1,893,454

UNITED STATES PATENT OFFICE

FERDINAND STOLZENBURG AND HENRY F. KING, OF SAN DIEGO, CALIFORNIA, ASSIGNORS TO KING SELF-SERVICE ELECTRIC DINER INC., LTD., A CORPORATION OF CALIFORNIA

HEATED TABLE

Application filed January 21, 1929, Serial No. 333,996. Renewed June 2, 1932.

This invention relates to heated tables, an object being to provide a dining table wherein food may be kept in a heated condition, so that persons using the table may serve themselves directly from the warming or heating compartments provided in the table.

Another object of the invention is the provision of a table of the above character which will be useful in hotels, hospitals, restaurants and private residences and may be readily moved to a desired room and connected with the usual house current so as to keep the food at a desired temperature.

Another object of the invention is the provision of a table which in addition to the above and other advantageous features, includes a novel heat circulating system, whereby heat is delivered to various food compartments provided in the table.

With the above and other objects in view, the invention further includes the following novel features and details of construction, to be hereinafter more fully described, illustrated in the accompanying drawings and pointed out in the appended claim.

In the drawings:—

Figure 1 is a side elevation of a table constructed in accordance with the invention.

Figure 2 is an end view showing the doors in open position.

Figure 3 is a section on the line 3—3 of Figure 2.

Figures 4, 5 and 6 are sections taken respectively on the lines 4—4, 5—5 and 6—6 of Figure 3.

Figure 7 is an enlarged fragmentary section taken substantially on the line 7—7 of Figure 3.

Referring to the drawings in detail wherein like characters of reference denote corresponding parts, the invention as shown comprises a casing which may be made of any suitable material. For example, the casing may be made of sheet metal arranged upon an angle iron frame and may be finished to represent wood, the finish being of a character that will not be easily marred. The casing is in the form of a table and includes a hollow top 10 and legs 11, the latter being provided at each end of and extending downward from the top and also being of hollow construction. The legs 11 extend preferably the entire width of the table and their opposed walls are relatively inclined so as to provide space for the legs of persons using the table. The lower ends of the legs are connected by an inverted U-bar 12, while spaced rollers or casters 13 are secured to the bottoms of the legs so that the table may be readily moved about with a minimum amount of effort.

The hollow top 10 extends the entire length and width of the table and provides a compartment 14 which is preferably designed to contain meats and vegetables. This compartment is open at one end and is normally closed by the outer end 15 of a drawer 16 within which the food is adapted to be placed. The walls of this drawer are provided with openings 17 to permit of the ready circulation of heat. The drawer is spaced from the bottom of the compartment 14 and is supported in position upon anti-friction rollers 18 so that the drawer may be readily moved outward and inward.

The table is provided with a top 19 of any suitable material which is held in place by means of a surrounding flange 20. Located beneath the top 19 are layers 21 of suitable heat insulating material, while an insulating space 22 is arranged between this material and the top 19. This space if desired may contain a partial vacuum so as to effectually insulate the top 19.

The legs 11 are divided into vertically arranged chambers 23, 24 and 25, the first mentioned chamber being designed to contain dishes so that the said dishes may be kept properly warmed to receive the food. The chambers 24 may contain liquids, while the chambers 25 which are the lowermost chambers contain electric heating elements 26. These heating elements are designed to receive current from any suitable source and for this purpose a socket 27 is provided for connection with the house current, while a switch 28 permits of cutting out one of the elements 26 when desired. The bar 12 in addition to stabilizing the legs 11 also provides for the reception of an electric cable 29 for the supply of current to one of the heating elements.

In order to supply heat to the chambers 14, 23 and 24, a heat passage 30 extends upward around three sides of the compartments while horizontal heat passages 31 extend between the compartments and communicate with the passages 30. The heat is thus supplied to the top, bottom and sides of the compartments.

The compartments 23 and 24 are provided with doors 32 which are hinged as at 33 and swing outward and downward their opening movement being limited by curved rods 34 which have one of their ends secured to the doors and their other ends provided with hooks 35 which engage the housing. The compartments 25 are provided with doors 36 which are hinged as at 37. These doors are held in closed position by suitable latches 38.

The invention is susceptible of various changes in its form, proportions and minor details of construction and the right is herein reserved to make such changes as properly fall within the scope of the appended claim.

Having described the invention what is claimed is:—

A heating table comprising a casing including a top portion and diverging leg portions extending downwardly from said top portion, said top portion having a compartment extending the full length thereof and opening outwardly through one end, a drawer mounted in said compartment and spaced from the walls thereof to provide heat passages thereabout, insulation between the passages and the top portion, said drawer having slots in the sides thereof to establish communication between the interior thereof and with the passages, partitions dividing the leg portions into compartments, insulation about the compartments of the leg portions and forming heat passages communicating with the first named heat passages, and heating mediums located in the lower ends of the leg portions and having communication with the last named heat passages.

In testimony whereof we affix our signatures.

FERDINAND STOLZENBURG.
HENRY F. KING.